United States Patent
Yeh et al.

(10) Patent No.: US 7,245,285 B2
(45) Date of Patent: Jul. 17, 2007

(54) PIXEL DEVICE

(75) Inventors: Bao-Sung Bruce Yeh, Corvallis, OR (US); James Richard Przybyla, Philomath, OR (US); Michael John Regan, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 645 days.

(21) Appl. No.: 10/833,121

(22) Filed: Apr. 28, 2004

(65) Prior Publication Data

US 2005/0243080 A1    Nov. 3, 2005

(51) Int. Cl.
G09G 3/34 (2006.01)
G09G 3/38 (2006.01)
G02B 26/02 (2006.01)

(52) U.S. Cl. .................. 345/108; 345/55; 359/227; 359/233; 359/234

(58) Field of Classification Search ............... 345/108, 345/109, 110, 111; 359/227, 233, 234
See application file for complete search history.

(56) References Cited

U.S. PATENT DOCUMENTS

| | | | |
|---|---|---|---|
| 5,990,973 A | 11/1999 | Sakamoto | |
| 6,278,491 B1 | 8/2001 | Wang et al. | |
| 6,329,967 B1 * | 12/2001 | Little et al. | 345/55 |
| 6,525,483 B1 | 2/2003 | VanGorkom et al. | |
| 2001/0043171 A1 * | 11/2001 | Van Gorkom et al. | 345/75.1 |
| 2002/0136450 A1 | 9/2002 | Chen et al. | |
| 2002/0172419 A1 | 11/2002 | Lin et al. | |
| 2002/0176623 A1 | 11/2002 | Steinberg | |
| 2003/0044063 A1 | 3/2003 | Meckels et al. | |
| 2003/0044070 A1 | 3/2003 | Fuersich et al. | |
| 2003/0044177 A1 | 3/2003 | Oberhardt et al. | |
| 2003/0044178 A1 | 3/2003 | Oberhardt et al. | |
| 2003/0202105 A1 | 10/2003 | Gaubatz et al. | |
| 2004/0008396 A1 | 1/2004 | Stappaerts | |
| 2004/0037460 A1 | 2/2004 | Luo et al. | |
| 2004/0046878 A1 | 3/2004 | Jarman | |
| 2005/0195138 A1 * | 9/2005 | Anderson et al. | 345/85 |

* cited by examiner

Primary Examiner—Richard Hjerpe
Assistant Examiner—My-Chau T. Tran

(57) ABSTRACT

A pixel device, comprising; a first plate, a second plate disposed under the first plate, and a third plate disposed under the second plate; a first power supply for providing a first voltage to the first plate; a second power supply for providing a second voltage to the second plate; and a third power supply for providing a third voltage to the third plate.

21 Claims, 6 Drawing Sheets

PIXEL DEVICE

BACKGROUND

Micro-mechanic optical devices have been applied quite commonly as basic pixel components/elements in display products. The pixel element is a spatial light-modulating optical cavity, actuated by electrical voltages. Through an interference method, the pixel element generates different color reflections. Typically, the pixel element operates with a high voltage. A high voltage device to drive a pixel element complicates design implementation.

DETAILED DESCRIPTION OF THE EMBODIMENTS

FIGS. 1, 2, 3, 4, 5, and 6 are provided for illustration purposes only and are not intended to limit the present invention; one skilled in the art would recognize various modifications and alternatives, all of which are considered to be a part of the present invention.

Figure 1:
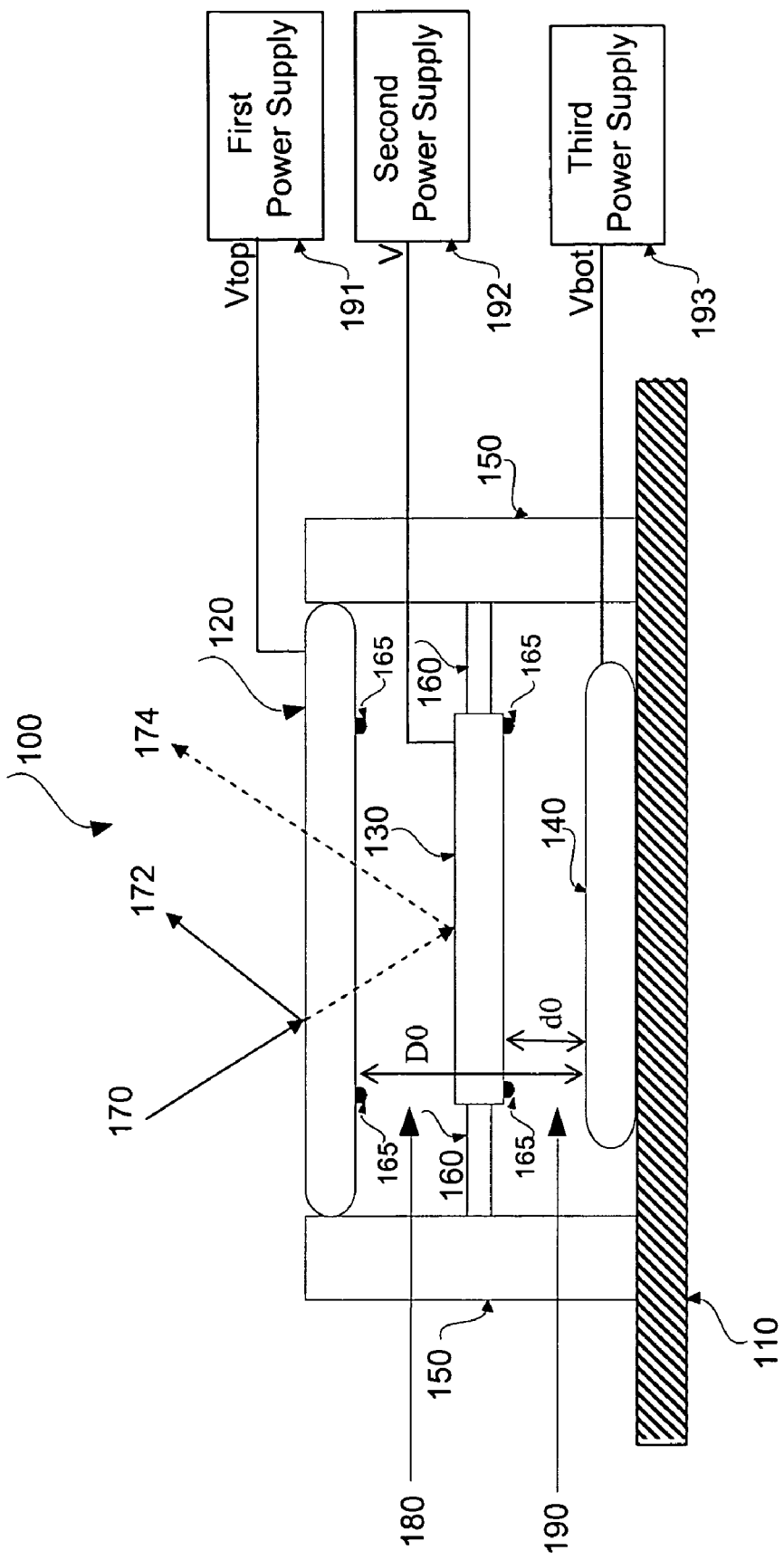
FIG. 1 is a schematic diagram of a pixel device illustrating a second plate equidistant to a first plate and a third plate according to one embodiment of the present invention.
Figure 2:
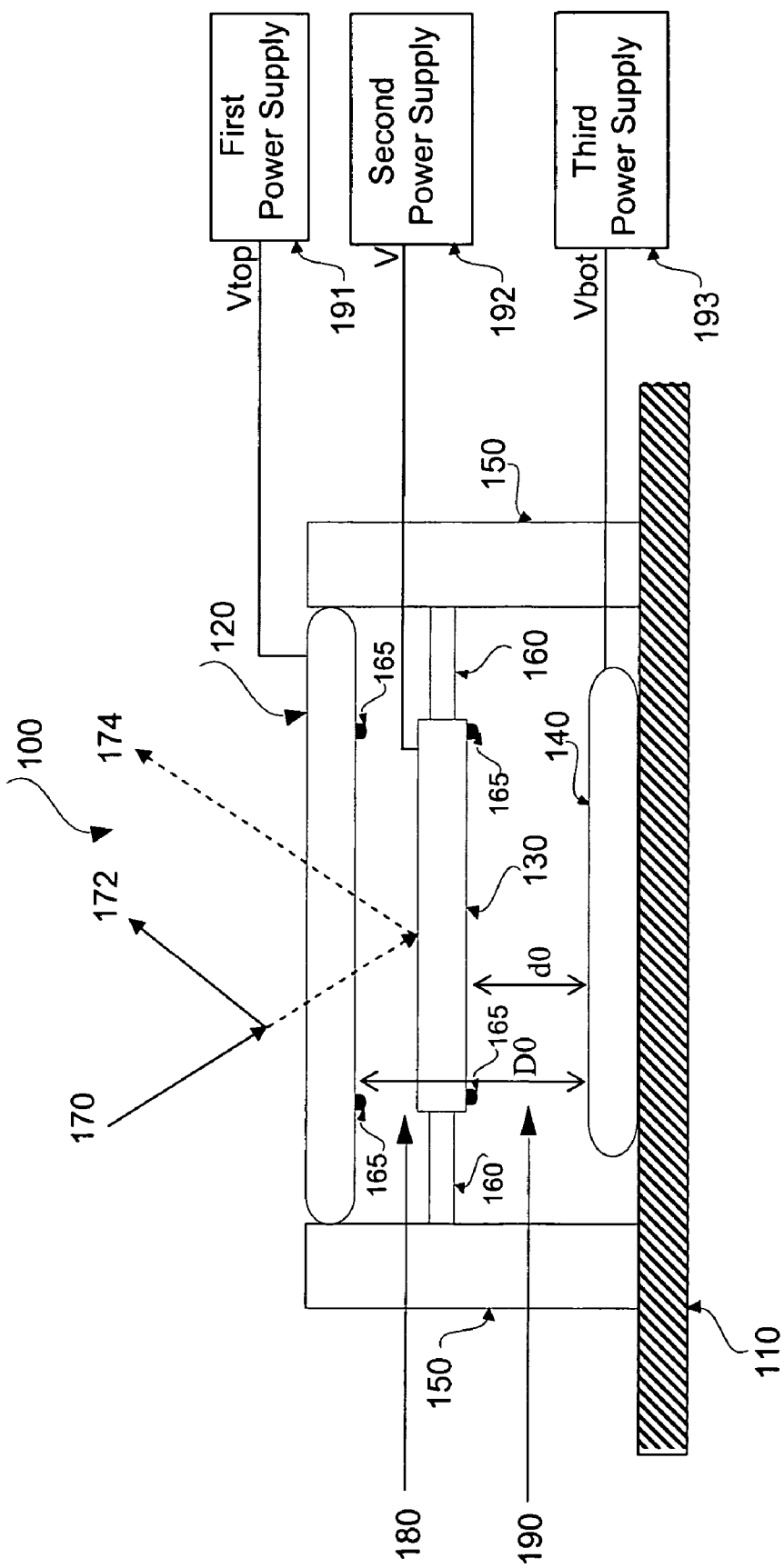
FIG. 2 is a schematic diagram of a pixel device illustrating a second plate closer to a first plate according to one embodiment of the present invention.
Figure 3:
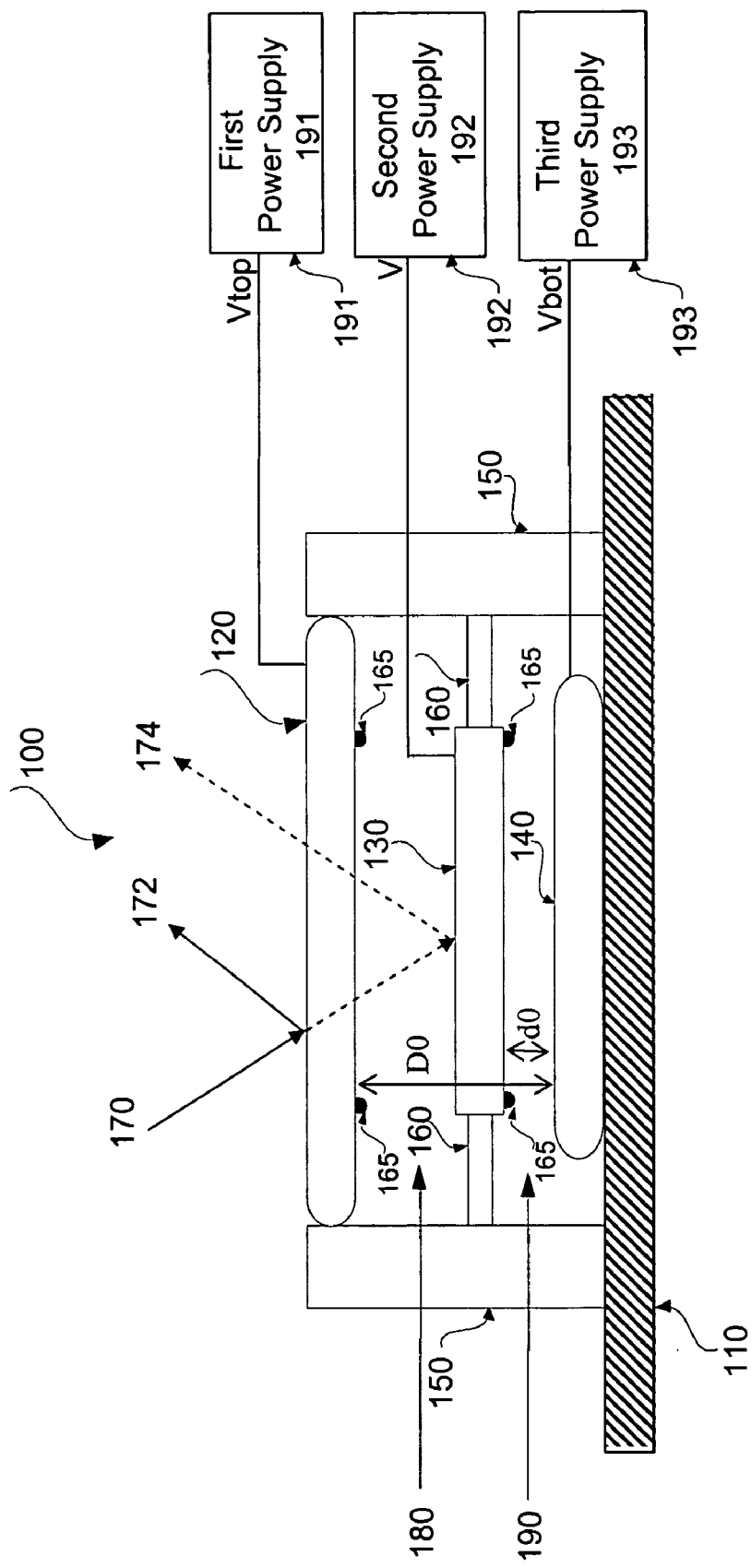
FIG. 3 is a schematic diagram of a pixel device illustrating a second plate closer to a third plate according to one embodiment of the present invention.

FIG. 1 represents one embodiment of a pixel device 100 disposed on a substrate 110. The pixel device 100 comprises a DLD (diffractive light device) MEMS (microelectromechanical system) structure. The pixel device 100 comprises a first plate 120, a second plate 130 disposed under the first plate 120, and a third plate 140 disposed under the second plate 130. The second plate 130 is movable. The first plate 120 directly supported by posts 150 and the third plate 140 disposed on the substrate 110, are substantially stationary relative to each other. According to one embodiment, depending upon the pixel device 100 configuration, the second plate 130 can be closer to the first plate 120 as shown in FIG. 2, or the third plate 140 as shown in FIG. 3, or disposed equidistant between the plates 120, 140 as shown in FIG. 1. The second plate 130 is supported by flexures 160, which in turn are supported by posts 150.

In one embodiment, the second plate 130 is reflective and the first plate 120 is semi-transparent. An arrow 170 indicates light entering on the first plate 120. Arrows 172 and 174 indicate light exiting from the first plate 120 and the second plate 130, respectively. The color output of the pixel device 100 is the result of interference between the light rays 172 and 174. According to one embodiment, the first plate 120 may be made from titanium. The second plate 130 and the third plate 140 may be made from aluminum. The flexures 160 may comprise an alloy of aluminum/titanium. However, the above materials are not limiting and any other suitable materials can also be used.

The pixel device 100 can be built using standard microelectronic fabrication techniques such as photolithography, vapor deposition and etching. However, the above techniques are not limiting on the invention and any other suitable techniques can also be used. The disclosure of copending U.S. patent application Ser. No. 10/428,261 entitled "Optical Interference Pixel Display with Charge Control", filed on Apr. 30, 2003, which relates to the fabrication of the pixel device 100 of the type to which the embodiments of the invention are directed, is hereby incorporated by reference as an example of a fabrication technique.

The pixel device 100 thus comprises a first gap structure for creating an optical/electrostatic gap 180 of a first dimension, and a second gap structure for creating an electrostatic gap 190 of a second dimension. The first plate 120 and the second plate 130 which define the first gap structure, act as one pair of electrodes of a parallel plate capacitor. The second plate 130 and the third plate 140 which define the second gap structure, act as another pair of electrodes of a parallel plate capacitor. The reference numeral d0 in FIG. 1 represents one distance of the electrostatic gap 190 and the reference numeral D0 represents total distance of both optical/electrostatic gap 180 and the electrostatic gap 190, and also includes the thickness of the second plate 130. The optical/electrostatic gap 180 and the electrostatic gap 190 are set as a result of a balance of electrostatic forces between the first plate 120, the second plate 130 and the third plate 140, and mechanical spring forces of flexures 160 and voltage biases to be discussed below. Both the optical/electrostatic gap 180 and the electrostatic gap 190 may comprise a gap range on the order of 800 to 6000 Angstroms. Other suitable dimensions may be employed in some embodiments.

According to one embodiment, as shown in FIGS. 1, 2, and 3 a first power supply 191 provides a first voltage Vtop to the first plate 120, a second power supply 192 provides a second voltage V to the second plate 130, and a third power supply 193 provides a third voltage Vbot to the third plate 140. The first power supply 191 is operated so that the first plate 120 is one of positively biased or negatively biased relative to the second plate 130 and the third power supply 193 is operated so that the third plate 140 is the other of positively biased or negatively biased relative to the second plate 130. The second power supply 192 is operated so that the second voltage V comprises a variable signal voltage that modulates the position of the second plate 130. According to the embodiment as shown in FIGS. 1, 2, and 3 by providing the third voltage Vbot, a low voltage operated pixel device 100 can be created as discussed below.

The electrostatic forces generated between the first plate 120, the second plate 130 and the third plate 140 can be balanced with the mechanical spring forces of flexures 160 as defined in the equation below.

$$-\frac{1}{2} \cdot \varepsilon \cdot A1 \cdot \left[\frac{Vtop - V}{D0 - (d0 - x)}\right]^2 + \frac{1}{2} \cdot \varepsilon \cdot A2 \cdot \left[\frac{V - Vbot}{d0 - x}\right]^2 = k \cdot x \quad (1)$$

where $\varepsilon$ is the permittivity of free space, A1 is the area of the first plate 120 and the second plate 130, A2 is the area of the second plate 130 and the third plate 140, k is the linear spring constant of flexures 160 and x is the displacement of the second plate 130 with respect to its original position.

Referring to equation (1), the first term in the left hand side of the equation represents the electrostatic force generated between the first plate 120 and the second plate 130, and represents one pair of electrodes of a parallel plate capacitor. The second term in the left hand side of the equation represents the electrostatic force generated between the second plate 130 and the third plate 140, and represents the other pair of electrodes of a parallel plate capacitor. The negative and positive signs represent the second plate 130 being pulled up and down, respectively.

According to another embodiment of the present invention, the pixel device 100 dual gap dimensions can be optimized by plotting the equation (1). By plotting different structure dimensions for the first plate 120, the second plate 130 and the third plate 140, and as well as mechanical spring forces of flexures 160, the low voltage operated pixel-device 100 is created. By way of example, for a 20 µm×20 µm second plate 130, the second plate 130 movement can be calculated and optimized for a given applied signal voltage V. Also the voltage sensitivity, pull-in effect, and the hysteresis characteristics of the second plate 130 can be analyzed.

The final result of the optimization program is that the low voltage operated pixel-device 100 can be created with a distance of 0.3 µm for the optical/electrostatic gap 180 and 0.6 µm for the electrostatic gap 190 and with 3.3 µN/µm for total spring constant for the flexures 160. To permit a low voltage signal operation in the range of 0-5 V, the first plate 120 can be biased with a positive voltage, Vtop=3.3V, the second plate 130 can be applied with a variable signal voltage V in a range of 0-5V, and the third plate 140 can be biased with a negative voltage Vbot=−3.3V. However, the above parameters optimized by the program for the low voltage operation of the pixel-device 100 are not limiting on the invention and any other suitable parameters can also be used.

Figure 4:
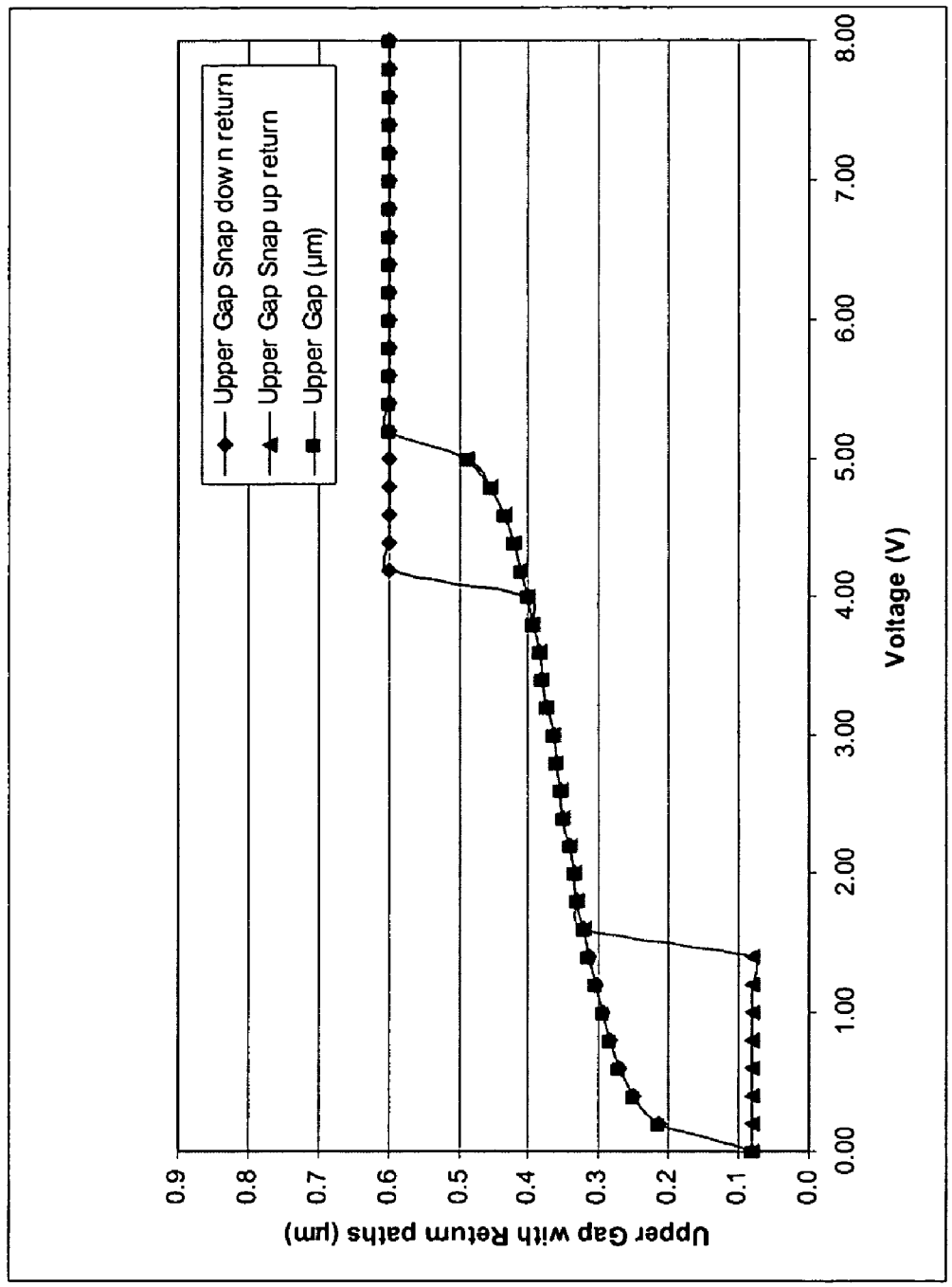
FIG. 4 is a graph representing upper gap with return paths vs. applied signal voltage to pixel-plate with Vtop=3.3V and Vbot=−3.3V, according to an example embodiment.

FIG. 4 shows a low voltage characteristic for a pixel device 100 according to one embodiment of the present invention. For the purposes of illustration, the optical/electrostatic gap 180 is referred as the upper gap and the electrostatic gap 190 is referred as the lower gap. Referring to FIG. 4, an applied signal voltage V above 5V need not be used in the present invention. The square dotted curve shows the upper gap corresponding to the second plate 130 movement. Thus it was discovered, per FIG. 4, that during the second plate 130 initialization, when both the biasing voltages Vtop=3.3V and Vbot=−3.3V are applied to the first plate 120 and the third plate 140 simultaneously, the second plate 130 can become unstable and snap up to the first plate 120 or snap down to the third plate 140 depending upon the configuration of the pixel device 100. The snap up and snap down occur because the electrostatic forces generated (equation (1)) are high enough to pull/snap the second plate 130 closer toward the first plate 120 or the third plate 140. After the second plate 130 is snapped up or snapped down, a change in the applied signal voltage V, will move the second plate 130 to return back to the original position. The second plate 130 return toward its original position is referred by the snap up return (triangular dotted curve) and snap down return (diamond dotted curve) as shown in FIG. 4. The upper gap snap up return is shown between 0 to 1.5 V with a resulting upper gap of approximately 0.08 µm. The upper gap snap down return is shown between 4 to 5 V with a resulting upper gap of approximately 0.6 µm.

Figure 5:
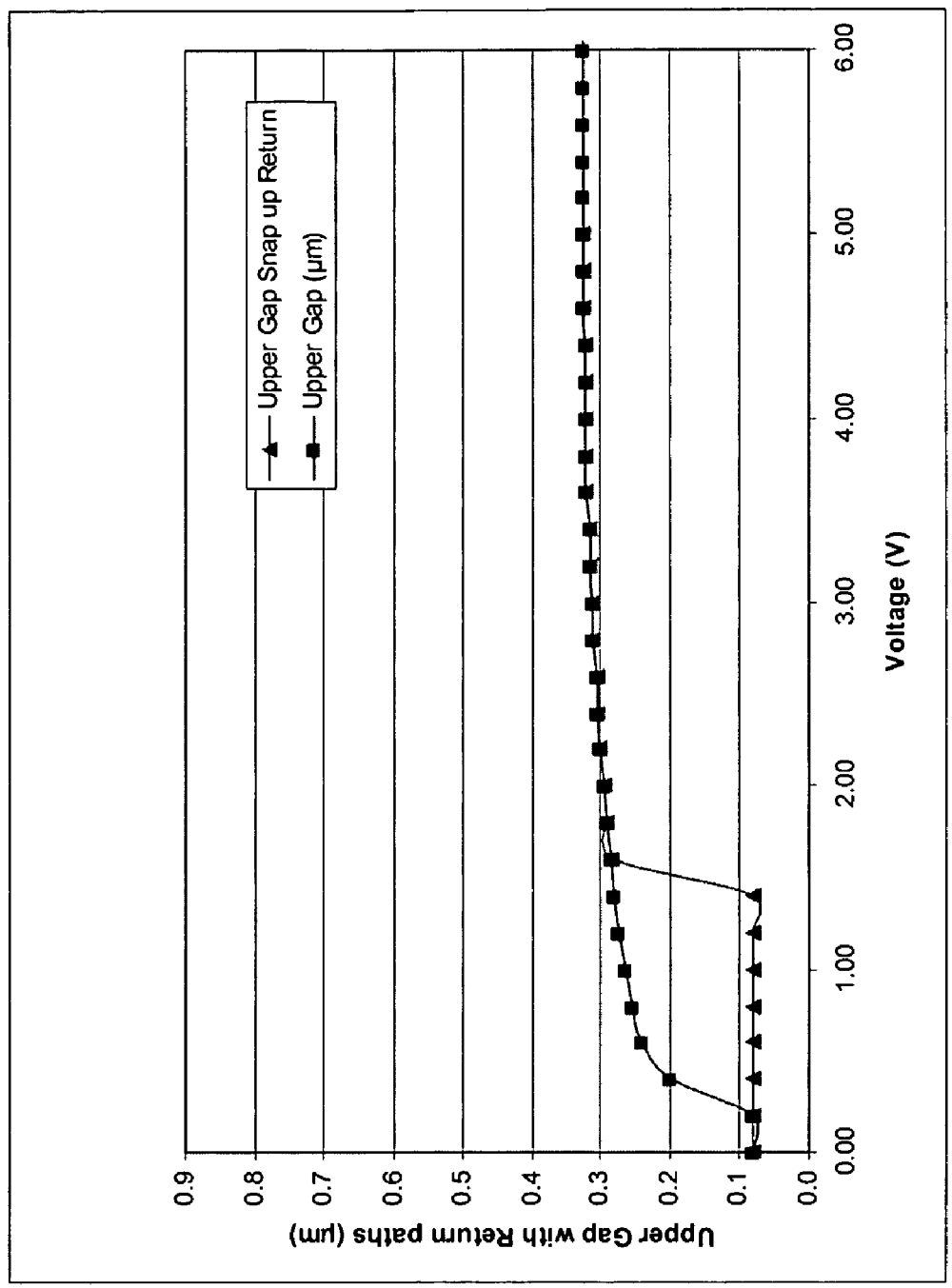
FIG. 5 is a graph representing upper gap with return paths vs. applied signal voltage to pixel-plate with Vtop=3.3V and Vbot=0V, according to an example embodiment.

According to one embodiment, FIG. 4 illustrates the second plate 130 snapping up to the first plate 120 at 0V, with a resulting upper gap of approximately 0.08 µm. Note that a short circuit may occur if the second plate 130 touches (leaving 0 µm for upper gap or lower gap) either the first plate 120 or third plate 140. In order to prevent the short circuit, in one embodiment, non-conductive bumps 165 can be located on the bottom surfaces of the second plate 130 and the first plate 120 as shown in FIGS. 1, 2, and 3. Since the bumps 165 are non-conducting, even if the second plate 130 touches either the first plate 120 or third plate 140 the occurrence of short circuit is prevented. According to one embodiment, the conductive bumps 165 comprise an insulating material such as silicon-di-oxide. However, the number, the type of material used, and the location of the bumps 165 are not limiting, and any suitable means can also be used. As shown in FIG. 5, when the second plate 130 snaps up to the top-cap-plate 120, an upper gap of approximately 0.08 µm is created instead of 0 µm.

Figure 6:
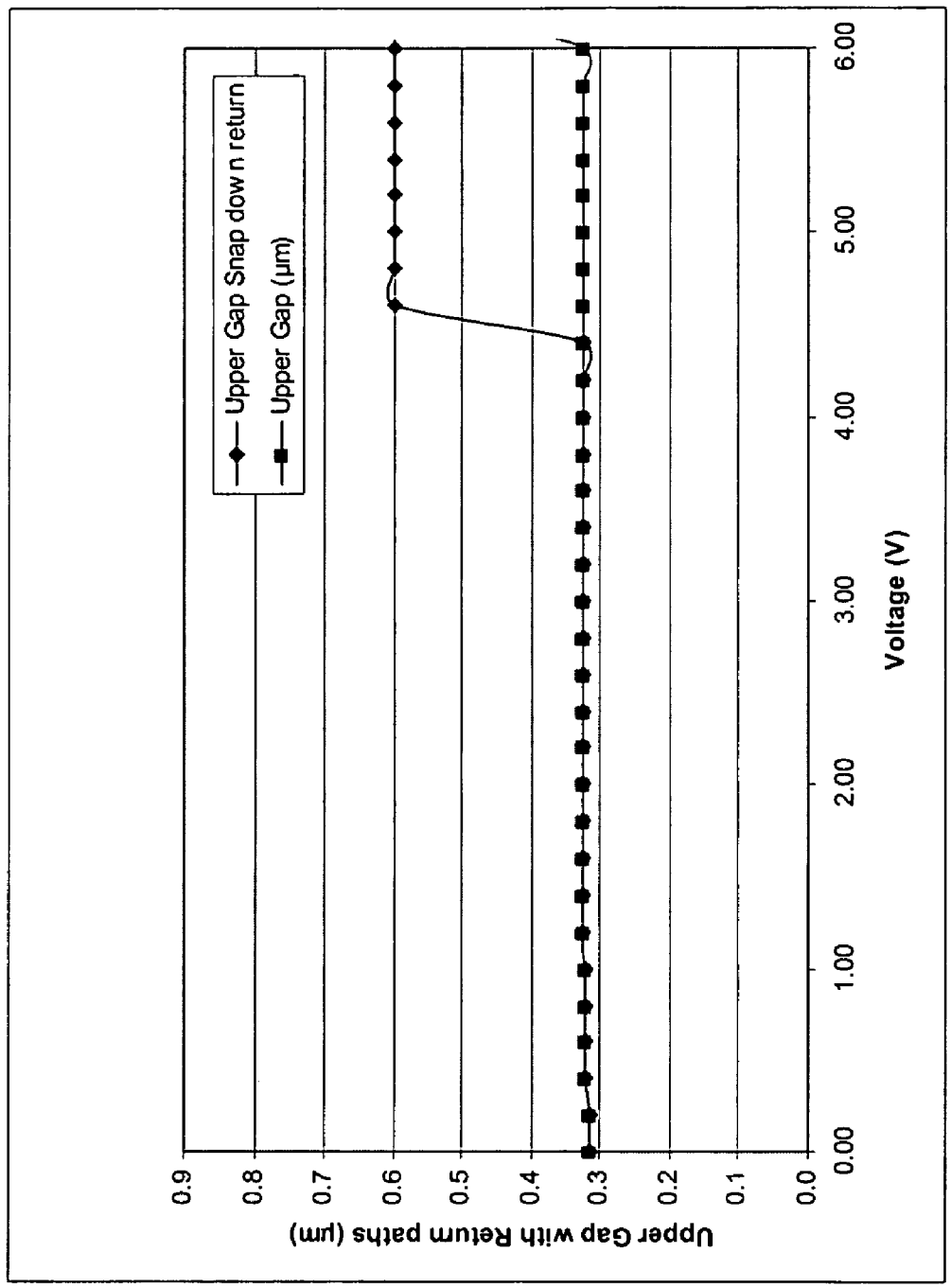
FIG. 6 is a graph representing upper gap with return paths vs. applied signal voltage to pixel-plate with Vtop=0V and Vbot=−3.3V, according to an example embodiment.

To address this issue of snap up or snap down, either the pixel device 100 structure dimensions can be redesigned by sacrificing some operating voltage range of the second plate 130 or a voltage turn-on sequence can be arranged to the power supplies 191, 192, and 193 during the second plate 130 initialization. FIGS. 5 and 6 show the analysis prediction for biasing the first plate 120 as one of the first or third biased plate with a positive or negative voltage and followed in sequence by the second plate with a signal voltage V and finally followed by the third plate 140 as the other of the first or third biased plate with a positive or negative voltage. Referring to FIG. 5, an example of an undesirable snap up is shown when the wrong biasing sequence is used. During the second plate 130 initialization, Vtop of 3.3V is applied first in sequence, followed by V (with an initial setting in the range between 0-5 V) and Vbot of −3.3V. In this case, the second plate 130 will be unstable and snap up to the first plate 120 as shown by the square dotted curve in a configuration with an initial setting of 0.3 µm for lower gap and 0.6 µm for upper gap. This instability is because the upper gap (0.3 µm) is smaller as compared to the lower gap (0.6 µm) and the electrostatic force is high between the second plate 130 and the first plate 120. The snap up occurs between 0 to 0.2V with a resulting upper gap of approximately 0.08 µm.

Referring to FIG. 6, during the second plate 130 initialization, when Vbot of −3.3V is applied first in sequence, followed by V (with an initial setting in the range between 0-5 V) and Vtop of 3.3V, the second plate 130 will be stable and will not snap toward either the first plate 130 or third plate 140. The square dotted curve shows the second plate 130 being stable between 0 to 5V with an upper gap of approximately 0.3 µm. The upper gap snap down return shown by diamond dotted occurs between 4 to 5 V with a resulting upper gap of approximately 0.6 µm. This stability is because the lower gap (0.6 µm) is larger than upper gap (0.3 µm) and the electrostatic force is less between the second plate 130 and the third cap-plate 140. The separation in time between the application of biasing voltages Vtop, Vbot, and signal voltage V in one embodiment can be in the range of approximately 0.1 µsec to 1 µsec. In FIGS. 5 and 6, an applied signal voltage V above 5V need not be used.

As discussed above, in order to provide stability for the second plate 130 during chip initialization, the first plate 120, the second plate 130, and the third plate 140 are energized in a sequence depending upon the distance between the first plate 120 and the second plate 130, and the distance between the third plate 140 and the second plate 130. According to one embodiment of the configuration of the pixel device 100, as illustrated in FIGS. 5 and 6, since the distance between the third plate 140 and the second plate 130 (lower gap of 0.6 μm) is greater than a distance between the first plate 120 and the second plate 130 (upper gap of 0.3 μm), the third plate 140 is biased first. In contrast, in a configuration of the pixel device 100, wherein the distance between the first plate 120 and the second plate 130 is greater than the distance between the third plate 140 and the second plate 130, the first plate 120 is biased first.

The foregoing description of various embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. A pixel device, comprising;
   a first plate, a second plate disposed under the first plate wherein the second plate and the first plate include non-conductive bumps located on their bottom surfaces, and a third plate disposed under the second plate;
   a first power supply for providing a first voltage to the first plate;
   a second power supply for providing a second voltage to the second plate; and
   a third power supply for providing a third voltage to the third plate.

2. The device as defined in claim 1, wherein the device is a DLD (diffractive light device) MEMS (microelectromechanical system) device.

3. The device as defined in claim 1, wherein the second voltage comprises a variable signal voltage.

4. The device as defined in claim 3, wherein the variable signal voltage modulates the position of the second plate.

5. The device as defined in claim 1, wherein the first power supply is operated so that the first plate is one of positively biased or negatively biased relative to the second plate and the third power supply is operated so that the third plate is the other of the positively biased or negatively biased relative to the second plate.

6. The device as defined in claim 1, wherein the second plate is movable, and the first plate and the third plate are substantially stationary.

7. The device as defined in claim 1, wherein the second plate is closer to the first plate than the third plate.

8. The device as defined in claim 1, wherein the second plate is closer to the third plate than the first plate.

9. The device as defined in claim 1, wherein the second plate is equidistant between the first plate and the third plate.

10. The device as defined in claim 1, wherein the second plate is supported by flexures.

11. The device as defined in claim 1, wherein the second plate is reflective and the first plate is semi-transparent.

12. The device as defined in claim 1, wherein the non-conductive bumps comprise silicon-di-oxide.

13. The device as defined in claim 1, wherein the first plate, the second plate and the third plate are energized in a sequence.

14. The device as defined in claim 13, wherein a distance between the first plate and the second plate is greater than a distance between the third plate and the second plate and wherein the sequence comprises the first plate is biased first.

15. The device as defined in claim 13, wherein a distance between the third plate and the second plate is greater than a distance between the first plate and the second plate and wherein the sequence comprises the third plate is biased first.

16. A method for operating a pixel device, comprising:
    providing a first plate, a second plate disposed under the first plate wherein the second plate and the first plate include non-conductive bumps located on their bottom surfaces, and a third plate disposed under the second plate;
    preventing the first plate from shorting to the second plate;
    preventing the second plate from shorting to the third plate; and
    energizing the first plate, the second plate, and the third plate in a sequence to prevent snap up to the first plate or snap down to the third plate by the second plate.

17. The method as defined in claim 16, wherein a distance between the first plate and the second plate is greater than a distance between the third plate and the second plate and wherein the sequence comprises the first plate is biased first.

18. The method as defined in claim 16, wherein a distance between the third plate and the second plate is greater than a distance between the first plate and the second plate and wherein the sequence comprises the third plate is biased first.

19. A pixel device, comprising;
    a first plate, a second plate disposed under the first plate, and a third plate disposed under the second plate;
    means for preventing the first plate from shorting to the second plate;
    means for preventing the second plate from shorting to the third plate;
    first power supply means for providing a first voltage to the first plate;
    second power supply means for providing a second voltage to the second plate; and
    third power supply means for providing a third voltage to the third plate to prevent snap up to the first plate or snap down to the third plate by the second plate.

20. The device as defined in claim 19, wherein the second power supply means for providing a second voltage to the second plate comprises a variable signal voltage means for modulating a position of the second plate.

21. The device as defined in claim 19, wherein the first power supply means for providing a first voltage to the first plate comprises a positive or negative bias means for biasing the first plate relative to the second plate and wherein the third power supply means for providing a third voltage to the third plate comprises the other of a positive or negative bias means for biasing the third plate relative to the second plate.

* * * * *